(12) United States Patent
St. Denis

(10) Patent No.: US 7,726,298 B2
(45) Date of Patent: Jun. 1, 2010

(54) METHOD AND APPARATUS FOR HEATING A LIQUID STORAGE TANK

(75) Inventor: Perry Lucien St. Denis, Lloydminster (CA)

(73) Assignee: Newco Tank Corp., Sherwood Park (CA)

(*) Notice: Subject to any disclaimer, the term of this patent is extended or adjusted under 35 U.S.C. 154(b) by 0 days.

(21) Appl. No.: 10/795,372

(22) Filed: Mar. 8, 2004

(65) Prior Publication Data

US 2004/0173164 A1 Sep. 9, 2004

(51) Int. Cl.
*A47J 27/026* (2006.01)

(52) U.S. Cl. .................. 126/391.1; 126/360.1

(58) Field of Classification Search ............ 126/391.1, 126/376.1, 377.1, 373.1, 364.1, 350.1, 360.2, 126/390.1, 247, 19.5, 271.1, 271.2 R, 271.2 C, 126/378.1, 360.1; 122/26, 18.3, 18.31, 32; 432/63; 165/66, 303, 302; 166/303, 302; 60/320

See application file for complete search history.

(56) References Cited

U.S. PATENT DOCUMENTS

| 1,866,015 | A | * | 7/1932 | Davey ........................ 126/19.5 |
| 2,431,753 | A | * | 12/1947 | Holderle et al. .......... 126/391.1 |
| 3,522,843 | A | * | 8/1970 | New ............................ 166/60 |
| 3,757,745 | A | * | 9/1973 | Miller ........................ 122/18.3 |
| 4,003,139 | A | * | 1/1977 | Van Winkle ................ 126/19.5 |
| 4,014,316 | A | * | 3/1977 | Jones et al. ............... 126/391.1 |
| 4,172,445 | A | * | 10/1979 | Sellers .................. 126/343.5 A |
| 4,264,826 | A | | 4/1981 | Ullmann |
| 4,658,803 | A | * | 4/1987 | Ball et al. ................. 126/355.1 |
| 4,728,029 | A | | 3/1988 | Griebel et al. |
| 4,928,664 | A | * | 5/1990 | Nishino et al. ........... 126/391.1 |
| 4,978,064 | A | | 12/1990 | Steiner |
| 5,098,036 | A | | 3/1992 | Brigham et al. |
| 5,222,696 | A | * | 6/1993 | Brigham et al. ......... 244/134 R |
| 5,226,594 | A | | 7/1993 | Swenson |
| 5,577,661 | A | | 11/1996 | Puett, Jr. |
| 5,732,764 | A | | 3/1998 | Douglas |
| 5,957,500 | A | | 9/1999 | Wade |
| 5,988,280 | A | * | 11/1999 | Crawford et al. ............ 166/303 |
| 6,032,732 | A | * | 3/2000 | Yewell ........................ 166/57 |

FOREIGN PATENT DOCUMENTS

GB 2 089 022 A * 6/1982

* cited by examiner

*Primary Examiner*—Steven B McAllister
*Assistant Examiner*—Sarah Suereth
(74) *Attorney, Agent, or Firm*—Christensen O'Connor Johnson Kindness PLLC

(57) ABSTRACT

A method and apparatus for heating a liquid storage tank includes a liquid storage tank having an interior and a peripheral sidewall. An engine compartment is appended to the peripheral sidewall in front of the heat tube. An engine is disposed in the engine compartment. Heat given off from the engine during operation heats the engine compartment and such heat is transferred through peripheral sidewall to the interior of the liquid storage tank. An exhaust conduit extends into the interior of the liquid storage tank. Heat from hot exhaust gases passing through the exhaust conduit heats the interior of the liquid storage tank.

21 Claims, 5 Drawing Sheets

METHOD AND APPARATUS FOR HEATING A LIQUID STORAGE TANK

FIELD OF THE INVENTION

The present invention relates to a method and an apparatus for heating a liquid storage tank.

BACKGROUND OF THE INVENTION

Most producing oil wells within the Province of Alberta are set up in a similar fashion. A drive head is positioned on a well head. A production flow line extends from the well head to a liquid storage tank, which is spaced a distance from the well head. A propane burner shoots flame into a fire tube in the liquid storage tank. An engine positioned in a wooden shack adjacent to the well head, provides motive force to the drive head. Propane tanks positioned adjacent to the liquid storage tank, provide a fuel source for the propane burner and the engine respectively.

SUMMARY OF THE INVENTION

What is required is a more efficient method and apparatus for heating a liquid storage tank at a well site.

According to one aspect of the present invention there is provided an apparatus for heating a liquid storage tank which includes a liquid storage tank having an interior and a peripheral sidewall. An engine compartment is appended to the peripheral sidewall. An engine is disposed in the engine compartment. Heat given off from the engine during operation heats the engine compartment and such heat is transferred through the peripheral sidewall to the interior of the liquid storage tank. An exhaust conduit extends into the interior of the liquid storage tank. Heat from hot exhaust gases passing through the exhaust conduit is transferred to the interior of the liquid storage tank.

According to another aspect of the present invention there is provided a method of heating a liquid storage tank. The liquid storage tank has an interior and a peripheral sidewall. A first step involves appending an engine compartment to the peripheral sidewall of the liquid storage tank. A second step involves operating an engine in the engine compartment. Heat given off from the engine during operation heats the engine compartment and such heat is transferred through the peripheral sidewall to the interior of the liquid storage tank. A third step involves passing hot exhaust gases from the engine through an exhaust conduit into the interior of the liquid storage tank. Heat is transferred from the hot exhaust gases passing through the exhaust conduit to the interior of the liquid storage tank.

Every well site presently has an engine. With the method and apparatus, as described above, the engine is merely repositioned into an engine compartment in order to take maximum advantage of heat from the engine and the hot exhaust gases from the engine. In addition to the advantages gained through heat transfer, there is a secondary benefit of a reduction of noise from the engine. The engine is selected based upon the heat the engine generates during operation. Beneficial results have been obtained through the use of a marine engine, which generates more heat during operation.

Although beneficial results may be obtained through the use of the apparatus, as described above, it is preferred that the exhaust conduit extend horizontally from the heat tube to exterior of the engine compartment. The horizontal orientation is intended to avoid problems occurring of condensation within the exhaust conduit.

Although beneficial results may be obtained through the use of the apparatus, as described above, it is envisaged that the apparatus will be incorporated into a well site with the engine is used to operate a drive head on a well head of an oil well.

In such well site installations, further beneficial results have been obtained where heated engine coolant is circulated within an engine coolant conduit that is disposed along the exhaust conduit. Heat from the heated engine coolant is added to the heat from the hot exhaust gases to further transmit heat to the interior of the liquid storage tank.

Further, it is preferred that hydraulic flow lines from the engine to the drive head extend along a production flow line extending from the well head to the liquid storage tank. The heat from the hydraulic flow lines also helps to prevent the production flow line from freezing during winter operation.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
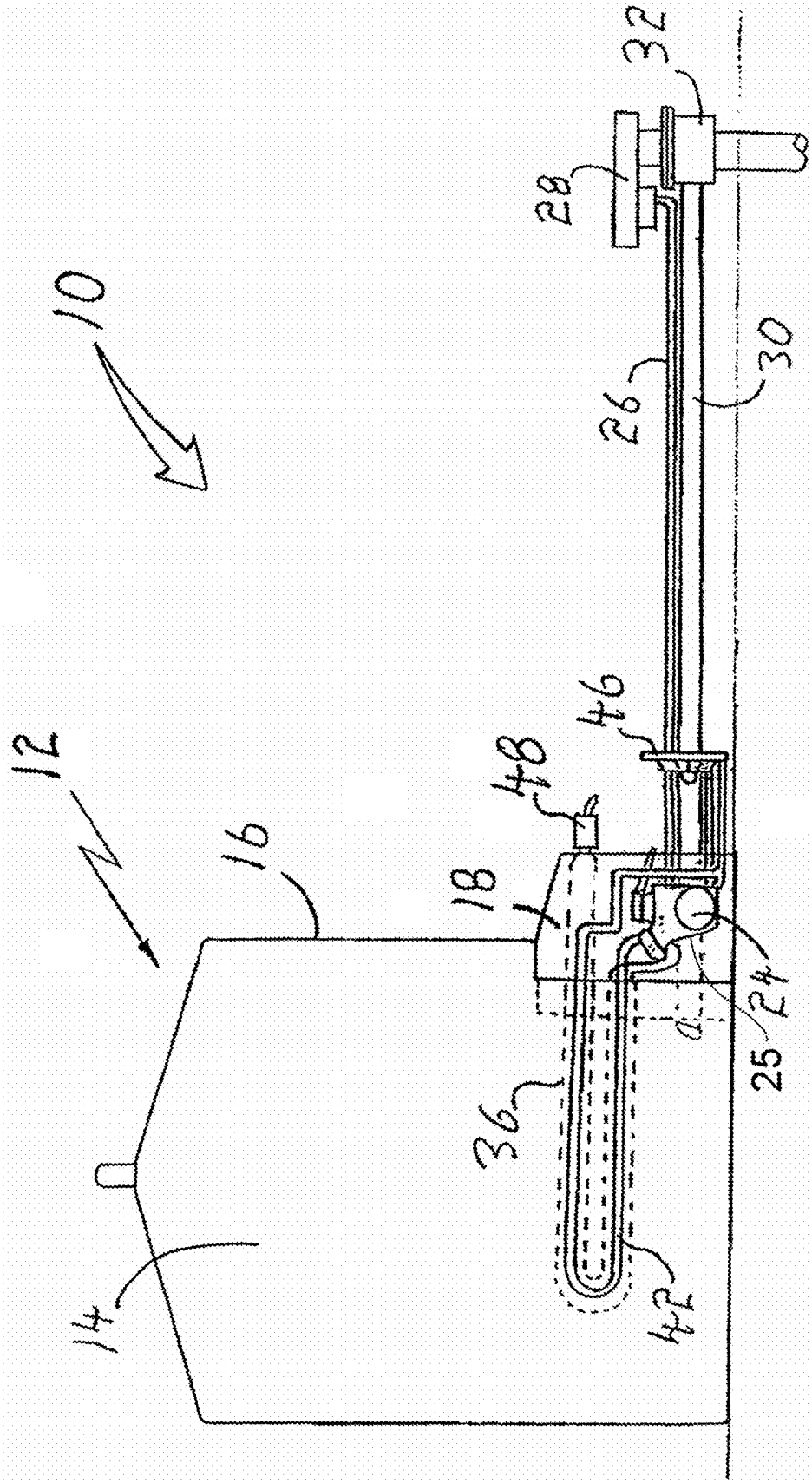
FIG. 1 is a side elevation view of a well site utilizing an apparatus for heating a liquid storage tank constructed in accordance with the teachings of the present invention.

The preferred embodiment, an apparatus for heating a liquid storage tank generally identified by reference numeral 10, will now be described with reference to FIGS. 1 through 5.

Figure 5:
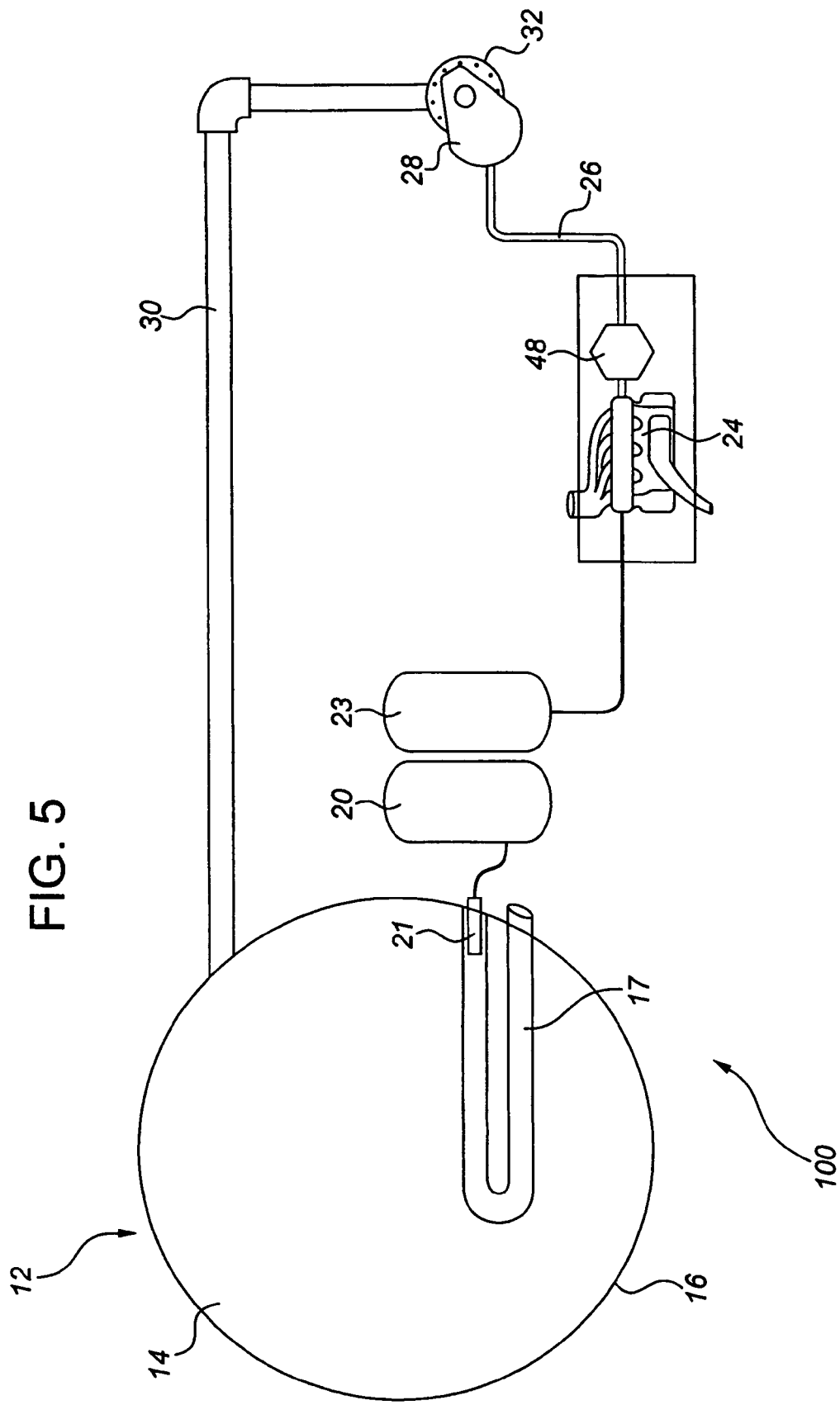
FIG. 5, labelled as PRIOR ART, is a top plan view of a prior art well site.

Referring to FIG. 5, there is illustrated a prior art well site, generally indicated by reference numeral 100. Well site 100 includes a liquid storage tank 12 having an interior 14, a peripheral sidewall 16 and a heat tube 17. A primary propane tank 20 provides fuel to a burner 21. A secondary propane tank 23 provides fuel to an engine 24 that is housed separate and apart from liquid storage tank 12. Hydraulic flow lines 26 driven by hydraulic pump 48 extend from engine 24 to drive head 28. A production line 30 extends from a well head 32 to liquid storage tank 12.

Figure 2:
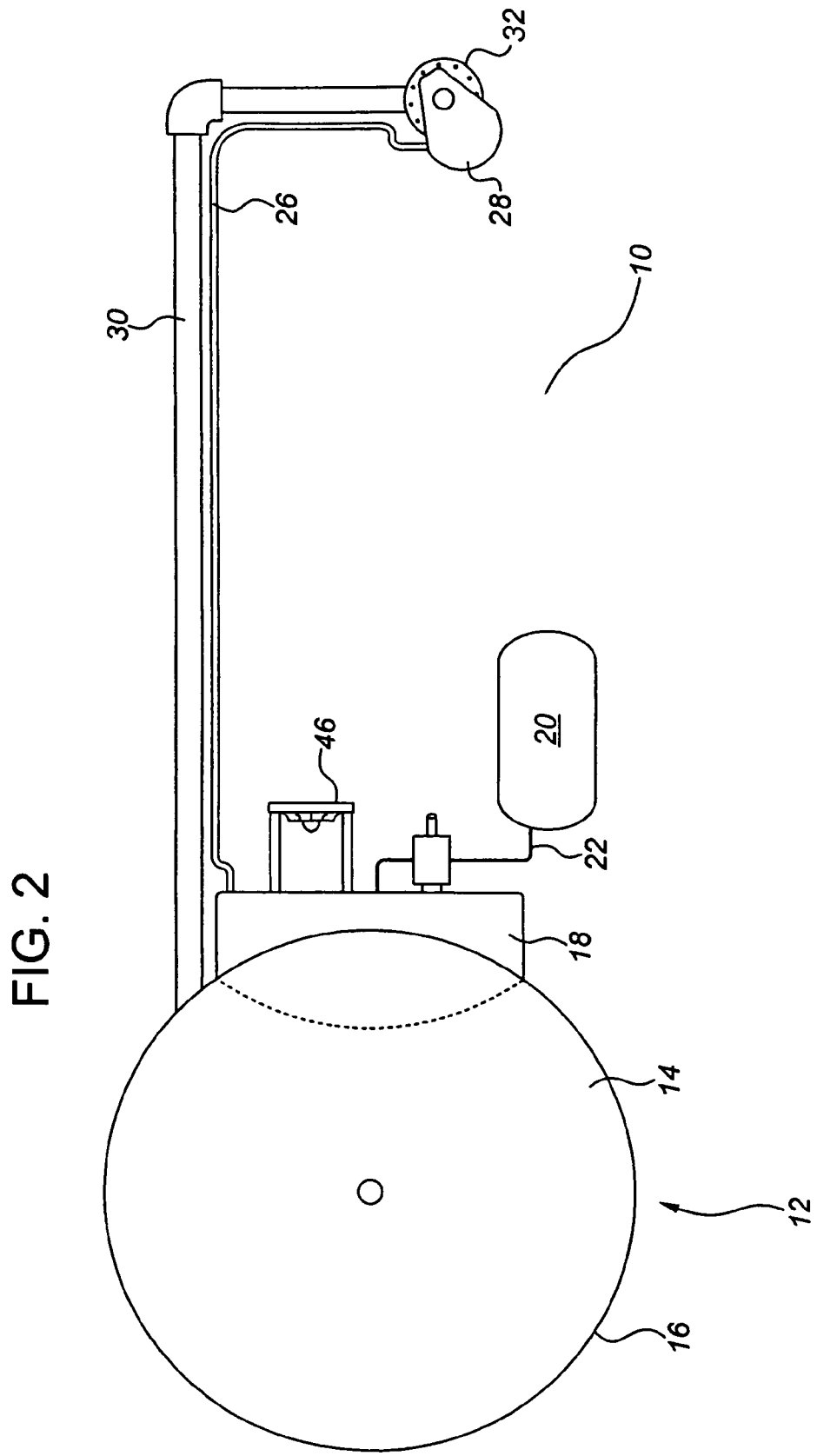
FIG. 2 is a top plan view of the well site utilizing the apparatus illustrated in FIG. 1.
Figure 3:
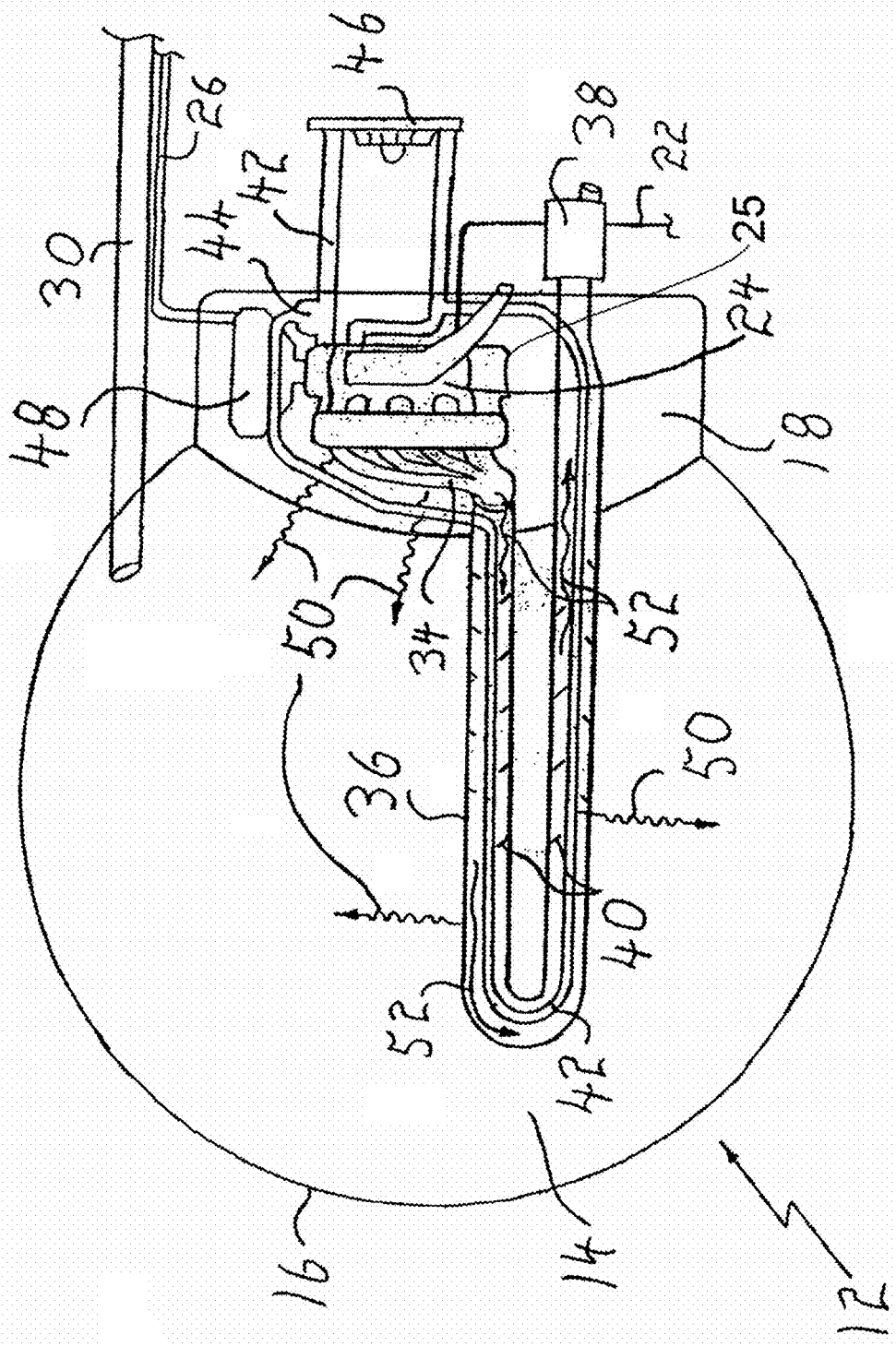
FIG. 3 is a top plan view of the liquid storage tank illustrated in FIG. 1.
Figure 4:
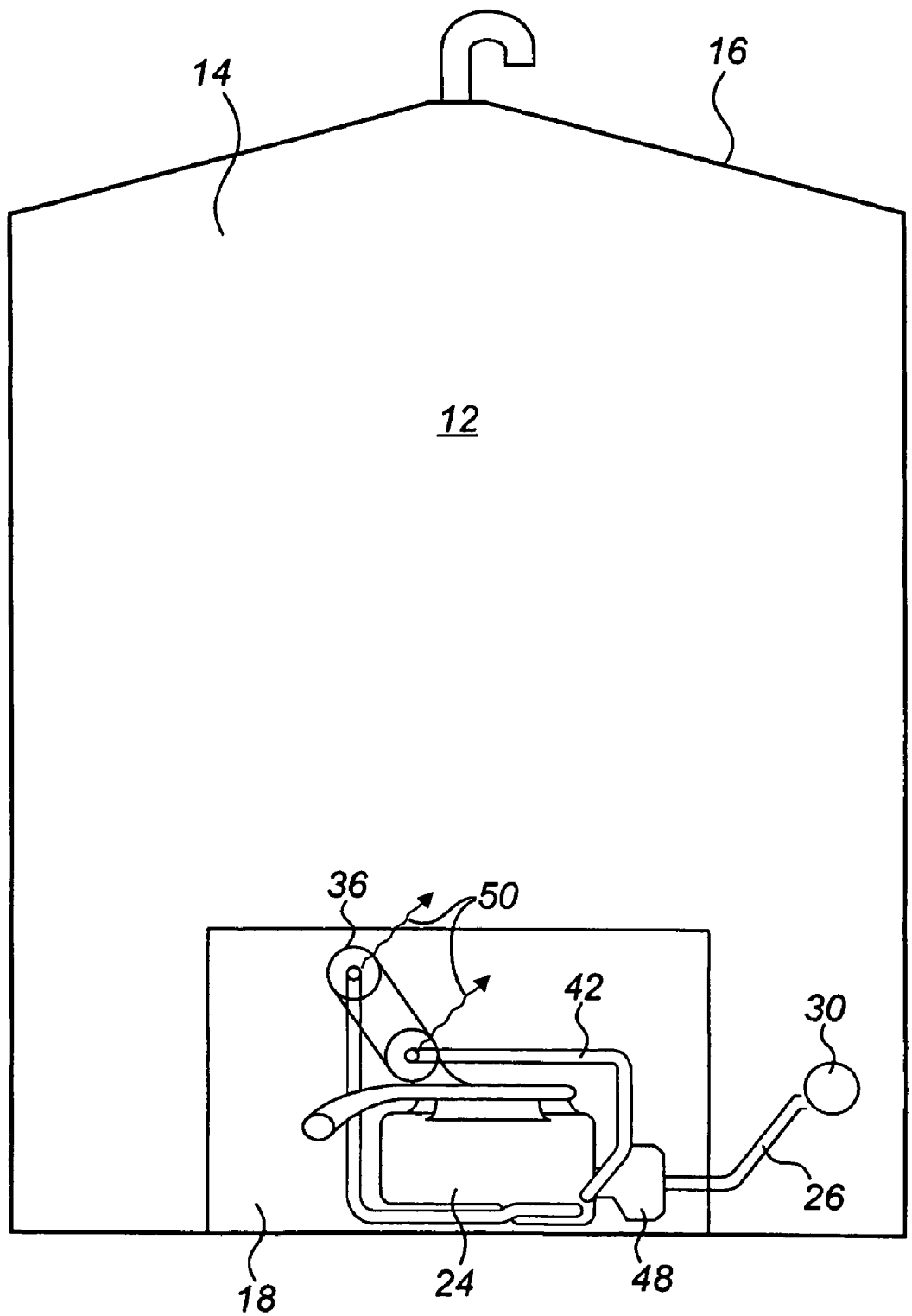
FIG. 4 is a front elevation view of the liquid storage tank illustrated in FIG. 1.

Structure and Relationship of Parts:

Referring to FIG. 1, apparatus 10 includes a liquid storage tank 12 having an interior 14, a peripheral sidewall 16 and an engine compartment 18 appended to liquid storage tank 12. Referring to FIG. 2, primary propane tank 20 provides fuel though fuel line 22 to engine compartment 18. Referring to FIGS. 1 and 3, an engine 24 and the corresponding engine block 25 is disposed within engine compartment 18. Referring to FIG. 2, hydraulic flow lines 26 extend from engine compartment 18 to drive head 28. A production line 30 extends from well head 32 to liquid storage tank 12. Hydraulic flow lines 26 are in a substantially parallel orientation and in close proximity to production line 30. Referring to FIG. 3, engine 24 has exhaust manifold 34 which is connected to an exhaust conduit 36 which extends from peripheral sidewall 16 into interior 14 of storage tank 12. In the illustrated embodiment, exhaust conduit 36 is in the form of a substantially horizontal loop that, upon exiting peripheral sidewall 16, is adapted with a muffler 38. Exhaust conduit 36 is further adapted with interior baffles 40. An engine coolant conduit 42 extends from engine 24. A thermostatically controlled valve 44 is positioned along engine coolant conduit 42. From thermostatically controlled valve 44, engine coolant conduit 42 extends along exhaust conduit 36. Referring to FIGS. 3 and 4, in the illustrated embodiment, engine coolant conduit 42 is positioned concentrically within exhaust conduit 36 and proceeds down the interior of exhaust conduit 36 and returns to engine 24. It will be appreciated that other configurations of routing may be made. Referring to FIG. 3, in addition, engine coolant conduit 42 extends to a remote radiator with fan 46 that also returns engine coolant to engine 24. Depending upon the orientation of thermostatically controlled valve 44, the flow of heated engine coolant may proceed by either route. Engine 24 is further adapted with hydraulic pump 48 that provides hydraulic pressure to hydraulic flow lines 26.

Operation:

The operation of apparatus 10 in accordance with the teachings of a preferred method will now be described with reference to FIGS. 1 through 5.

Referring to FIG. 3, engine 24 is operated within engine compartment 18. Referring to FIG. 2, fuel for the operation of engine 24 is provided by primary propane tank 20. No other source of fuel is needed. The noise of engine 24 is dampened by muffler 38 and absorption of sound by liquid storage tank 12 through peripheral sidewall 16. Heat 50, given off from engine 24 during operation, heats engine compartment 18 and such heat is transferred through peripheral sidewall 16 to interior 14 of liquid storage tank 12. Hot exhaust gases 52 from engine 24 pass through exhaust conduit 36 and heat 50 given off heats interior 14 of liquid storage tank 12. Interior baffles 40 disrupt the linear flow of hot exhaust gases 52 to more evenly distribute and transfer heat from hot exhaust gases 52 through exhaust conduit 36 to interior 14 of liquid storage tank 12. Referring to FIG. 4, in the illustrated embodiment, engine coolant conduit 42 is disposed concentrically within exhaust conduit 36. Heated engine coolant passes through engine coolant conduit 42 such that heat 50 is added to hot exhaust gases 52 to further transmit heat 50 to interior 14 of liquid storage tank 12. Referring to FIG. 3, for operation in warmer conditions, thermostatically controlled valve 44 diverts heated engine coolant to remote radiator with fan 46.

Upon operation of remote radiator with fan 46, the heated engine coolant is cooled and, in turn, cools exhaust conduit 36 and moderates the temperature of interior 14 of liquid storage tank 12. Referring to FIGS. 1 and 2, apparatus 10, by configuring hydraulic lines 26 in a substantially parallel orientation and in close proximity to production line 30, production fluid within production line 30 is also heated.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An apparatus for heating an oil well production storage tank, comprising:
   an oil well production storage tank having an interior, a peripheral sidewall, and an engine compartment that houses an engine appended to the peripheral sidewall to effectively share a portion of the peripheral sidewall with the tank, wherein at least a portion of the engine compartment is inset within a periphery of the tank;
   an engine block of an engine enclosed within the engine compartment, such that heat given off from the engine during operation heats the engine compartment and such heat is transferred to the interior of the tank through the portion of the peripheral sidewall that is shared by the engine compartment and the tank; and
   an exhaust conduit extending into the interior of the tank, such that heat from hot exhaust gases passing through the exhaust conduit is transferred to the interior of the tank.

2. The apparatus as defined in claim 1, wherein the engine is selected based upon the heat the engine generates during operation.

3. The apparatus as defined in claim 2, wherein the engine is a marine engine.

4. The apparatus as defined in claim 1, wherein the exhaust conduit extends horizontally to exterior of the engine compartment.

5. The apparatus as defined in claim 1, wherein the engine is used to operate a drive head on a well head of an oil well.

6. The apparatus as defined in claim 5, wherein hydraulic flow lines from the engine to the drive head extend along a production flow line extending from the well head to the tank.

7. The apparatus as defined in claim 1, wherein an engine coolant conduit extends from the engine along an exhaust conduit, such that heat from heated engine coolant adds heat to the interior of the tank.

8. The apparatus as defined in claim 7, wherein the engine coolant conduit passes concentrically along one of an interior or an exterior of the exhaust conduit and loops back to the engine.

9. The apparatus as defined in claim 1, wherein the exhaust conduit has interior baffles.

10. An apparatus for heating an oil well production storage tank, comprising:
    an oil well production storage tank having an interior, a peripheral sidewall, and an engine compartment housing an engine appended to the peripheral sidewall to effectively share a portion of the peripheral sidewall with the tank, wherein at least a portion of the engine compartment is inset within a periphery of the tank;
    an engine disposed in the engine compartment, the engine being used to operate a drive head on a well head of an oil well, the engine being selected based upon the heat the engine generates during operation, such that heat given off from the engine during operation heats the engine compartment and such heat is transferred to the interior of the tank through the portion of peripheral sidewall that is shared by the engine compartment and the tank;
    an exhaust conduit extending into the interior of the tank, such that heat from hot exhaust gases passing through the exhaust conduit is transferred to the interior of the tank; and
    an engine coolant conduit extending into the interior of the tank, such that heat from heated engine coolant passing through the engine coolant conduit is transferred to the interior of the tank.

11. The apparatus as defined in claim 10, wherein the engine is a marine engine.

12. The apparatus as defined in claim 10, wherein the engine coolant conduit passes concentrically along one of an interior or an exterior of the exhaust conduit and loops back to the engine.

13. The apparatus as defined in claim 10, wherein the exhaust conduit has interior baffles.

14. A method of heating an oil well production storage tank having an interior and a peripheral sidewall, comprising the steps of:
   - appending an engine compartment housing an engine to the peripheral sidewall of the tank to effectively share a portion of the peripheral sidewall with the tank, wherein at least a portion of the engine compartment is inset within a periphery of the tank;
   - operating an engine in the engine compartment, the engine being used to operate a drive head on a well head of an oil well, such that heat given off from the engine during operation heats the engine compartment and such heat is transferred to the interior of the tank through the portion of the peripheral sidewall that is shared by the engine compartment and the tank; and
   - passing hot exhaust gases from the engine through an exhaust conduit extending into the interior of the tank, such that heat is transferred from the hot exhaust gases to the interior of the tank.

15. The method as defined in claim 14, the engine is selected based upon the heat the engine generates during operation.

16. The method as defined in claim 14, the exhaust conduit extending horizontally to the exterior of the engine compartment.

17. The method as defined in claim 14, hydraulic flow lines from the engine to the drive head extending along a production flow line extending from the well head to the tank.

18. The method as defined in claim 14, an engine coolant conduit extending from the engine along an exhaust conduit, such that heat from heated engine coolant passing through the engine coolant conduit adds heat to the interior of the tank.

19. The method as defined in claim 18, the engine coolant conduit passing concentrically along one of an interior or an exterior of the exhaust conduit and looping back to the engine.

20. The method as defined in claim 14, the exhaust conduit having interior baffles.

21. An apparatus for heating an oil well production storage tank, comprising:
   - a liquid storage tank having an interior, a peripheral sidewall, and an engine compartment housing an engine that effectively shares a portion of the peripheral sidewall with the tank, wherein at least a portion of the engine compartment is inset within a periphery of the liquid storage tank; and
   - an engine block of an engine enclosed within the engine compartment, such that heat given off from the engine during operation heats the engine compartment and such heat is transferred by radiation from the engine compartment to the interior of the liquid storage tank through the portion of the peripheral sidewall that is shared by the engine compartment.

* * * * *

UNITED STATES PATENT AND TRADEMARK OFFICE
CERTIFICATE OF CORRECTION

PATENT NO.         : 7,726,298 B2
APPLICATION NO.    : 10/795372
DATED              : June 1, 2010
INVENTOR(S)        : P. L. St. Denis It is certified that error appears in the above-identified patent and that said Letters Patent is hereby corrected as shown below:

TITLE PAGE,

| Item (30) | Foreign Appln. Priority Data: | insert --(30) Foreign Application Priority Data March 7, 2003 Canada 2,421,384-- |

Signed and Sealed this

Seventh Day of September, 2010

David J. Kappos
*Director of the United States Patent and Trademark Office*